(12) United States Patent
Elisseeff

(10) Patent No.: US 8,314,195 B2
(45) Date of Patent: Nov. 20, 2012

(54) BIOLOGICAL ADHESIVE

(75) Inventor: Jennifer H. Elisseeff, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 653 days.

(21) Appl. No.: 12/358,809

(22) Filed: Jan. 23, 2009

(65) Prior Publication Data

US 2010/0003329 A1    Jan. 7, 2010

Related U.S. Application Data

(63) Continuation of application No. 11/816,608, filed as application No. PCT/US2006/005651 on Feb. 17, 2006, now abandoned.

(60) Provisional application No. 60/654,150, filed on Feb. 18, 2005, provisional application No. 60/654,152, filed on Feb. 18, 2005.

(51) Int. Cl.
*A61K 9/14* (2006.01)
*C08F 118/02* (2006.01)
(52) U.S. Cl. ........ 526/319; 424/487; 424/93.7; 523/118
(58) Field of Classification Search .................. 526/319; 424/487, 93.7; 523/118
See application file for complete search history.

(56) References Cited

U.S. PATENT DOCUMENTS

| | | | |
|---|---|---|---|
| 5,470,911 A | 11/1995 | Rhee et al. | |
| 6,201,065 B1 * | 3/2001 | Pathak et al. | 525/90 |
| 2007/0098675 A1 * | 5/2007 | Elisseeff et al. | 424/78.3 |
| 2009/0324722 A1 | 12/2009 | Elisseeff | |
| 2010/0010187 A1 | 1/2010 | Elisseeff | |

* cited by examiner

*Primary Examiner* — Robert D. Harlan
(74) *Attorney, Agent, or Firm* — Johns Hopkins Technology Transfer

(57) ABSTRACT

Biologically compatible polymers carry at least two different kinds of functional groups. Adhesive formulations include a biologically compatible adhesive, which can be used with a bridging molecule.

30 Claims, No Drawings

BIOLOGICAL ADHESIVE

RELATED APPLICATIONS

This application is a Continuation of U.S. application Ser. No.: 11/816,608; which is a National Stage of PCT/US2006/005651, filed Feb. 17, 2006, which claims the benefit of U.S. Provisional Application No. 60/654,150, filed Feb. 18, 2005, U.S. Provisional Application No. 60/654,152, filed Feb. 18, 2005, all of which are herein incorporated by reference in their entireties.

BACKGROUND OF THE INVENTION

Cross-linked polymeric biomaterials are being used in biomedical applications including coatings for medical devices, implants and drug delivery vehicles. Polymer networks may be formed, for example, by crosslinking water soluble monomers or polymers to form a water insoluble polymer network. Mechanical and structural properties may be manipulated by modification of the crosslinking density which controls, for example, network pore size, water content and mechanical properties.

A useful biomaterial mimics a naturally occurring material, tissue, organ and the like. However, ease of administration, biocompatibility, biodegradability and other requirements for in vivo use can constrain the full use of a material.

SUMMARY OF THE INVENTION

The instant invention provides a composition comprising a biologically compatible polymer functionalized by at least two different reactive moieties to provide a biological adhesive. In some embodiments, the composition comprises at least 10 monomeric units, at least 100 monomeric units or at least 1000 or more units of monomer. Generally, the polymer comprises plural copies of each of said at least two reactive moieties. Generally, the at least two reactive moieties react with different chemical structures on different target entities to provide the polymer with a predetermined orientation and directed, specific reaction with a target entity.

In one embodiment, a monomer of the biologically compatible polymer is functionalized with one species of reactive moiety.

The reactive moiety may be selected, for example, from methacrylates, ethacrylates, itaconates, acrylamides, thiols, peptides and aldehydes. For example, a polypeptide having a certain electronic configuration or a binding ability can be reactive group if that peptide interacts and binds to a complementary ligand or binding partner on a target surface. Thus, a collagen helix can be a suitable reactive moiety for binding to another collagen helix found in a target entity.

In another embodiment, a monomer is functionalized with two species of reactive moieties.

In another embodiment, a monomer is functionalized with more than two species of reactive moieties.

In a polymer, not all monomers need be functionalized with a reactive moiety.

The polymer can contain substantially equal molar amounts of the at least two different reactive moieties. When more than two reactive moieties are present, generally, the moieties comprise two classes of molecules that are reactive with two target entities, that is, the moieties of one class, while chemically distinct, react with the same target entity, although, the reaction may be with two different chemical structures on the said one target entity.

In another embodiment, a polymer of interest comprising at least three species of reactive moieties is reactive with at least three target entities.

In a polymer, to ensure directionality, either the backbone bonds of the polymer are flexible to obtain rotation about the axis of the polymer or all of one species of moiety are present on the same side of the polymer or are in the same orientation on the polymer.

One functional moiety is reactive with as a target entity, such as a biological surface of an organ, tissue or cell, such as a cartilage or bone surface. The second functional moiety is reactive with a second target entity, which may be the same or a different organ, tissue or cell. The second reactive moiety also can be reactive with a non-naturally occurring biologically compatible structure or biomaterial, such as a hydrogel or a prosthesis, the goal being to bring into proximity two like or dissimilar target entities. The reaction can be through any means that provides a level of adhesion, such as a covalent bond, a physical crosslinking, an ionic crosslinking or other molecular mechanism that affixes the polymer onto the surface, structure or entity reactive therewith.

In certain embodiments, multiple polymers are reacted together to form a multi-layer polymer structure with exposed surfaces having said at least two species of reactive moieties thereon.

Compositions of the present disclosure may further comprise a biologically active agent, such as a nutrient, a pharmaceutically active agent, a cell, such as a differentiated cell, such as a blood cell or a chondrocyte, or an undifferentiated cell, such as a stem cell, such as a hematopoietic stem cell or a mesenchymal stem cell, contained within or attached to the polymer.

The instant invention also provides a composition comprising two components, a biologically compatible polymer functionalized with a biological surface reactive moiety and a bridging molecule to provide a medical adhesive. In some embodiments, the polymer comprises at least 10 monomeric units, at least 100 monomeric units or at least 1000 or more units of monomer. The polymer also is reactive with the bridging molecule, generally also a polymer. That reaction can be with the same biological surface reactive moiety or with a different reactive moiety on the biologically compatible polymer. The bridging molecule contains plural reactive sites to ensure reaction with at least two biological surfaces having polymer bound thereon.

The biological surface reactive moiety may be selected, for example, from thiols, peptides and aldehydes. For example, a polypeptide having a certain electronic configuration or a binding ability can be a biological surface reactive moiety if that peptide interacts and binds to a complementary ligand or binding partner on a target biological surface. Thus, a collagen helix can be a suitable reactive moiety for binding to another collagen helix found on the surface of a cell, tissue or organ.

In another embodiment, a polymer is functionalized with two species of reactive moieties. The second moiety is for polymerization of monomers to form a polymer, for reacting with other polymers to produce a multiple layered structure or for reacting with and binding the biologically compatible polymer or the bridging molecule.

In a polymer, not all monomers need be functionalized with a reactive moiety.

In a polymer, to ensure directionality, either the backbone bonds of the polymer are flexible to obtain rotation about the axis of the polymer or all of one species of reactive moiety are present on the same side of the polymer or are in the same orientation on the polymer. In certain embodiments, the biologically compatible polymer is used alone as an adhesive. The polymer can be applied directly or be combined with a supporting structure, which may be an inert support, for example, to provide structure or stiffness to the polymer, or may be a device of desired function.

The biological surface reactive moiety binds to a site on the surface of a biological structure, such as an organ, tissue or cell, such as a cartilage or bone surface. Cartilage can be elastic, fibrous or hyaline, and is found throughout the body, for example, in the nose and ears, on bone surfaces, such as articulating bone surfaces, and in the discs between spinal vertebrae. A second functional moiety, which may be the same as that which binds the biological surface, is reactive with the bridging molecule. The reactions can be through any means that provide a level of adhesion, such as a covalent bond, a physical crosslinking, an ionic crosslinking or other molecular mechanism that affixes the molecules onto the surface, structure or entity reactive therewith.

In certain embodiments, multiple polymers are reacted together to form a multi-layer polymer structure with exposed surfaces reactive with the tissue and with the bridging molecule. The bridging molecule also can be a multiple layered structure.

Additional features and advantages of the present invention are described in, and will be apparent from the following Detailed Description of the Invention.

DETAILED DESCRIPTION OF THE INVENTION

The disclosure provides for functionalized biologically compatible polymers, such as polysaccharides, such as hyaluronate, keratan sulfate and the like, polypeptides and polynucleotides, which can serve as a means to attach a compound, tissue, organ, cell, prosthesis, device and the like to a biological surface. The materials of interest also can serve as a means to bring biological surfaces into proximity.

The term "biologically compatible polymer" refers to the polymer that is a naturally occurring polymer or one that is not toxic to the host. Generally, the metabolites of the polymer of interest also are not toxic to the host. It is not necessary that any subject composition have a purity of 100% to be deemed biocompatible; indeed, it is only necessary that the subject compositions be non-toxic to the host. Hence, a subject composition may comprise monomer, polymers or portions thereof comprising 99%, 98%, 97%, 96%, 95%, 90%, 85%, 80%, 75% or even less of biocompatible monomer, polymers or portions thereof, e.g., including monomers, polymers or portions thereof, and other materials and excipients described herein, and still be biocompatible.

To determine whether a polymer or other material is biocompatible, it may be necessary to conduct a toxicity analysis. Such assays are well known in the art. One example of such an assay may be performed with, for example, live carcinoma cells in the following manner: the sample is degraded in 1M NaOH at 37° C. until complete degradation is observed. The solution is then neutralized with 1M HCl. About 200 pL of various concentrations of the degraded sample products are placed in 96-well tissue culture plates and seeded with human carcinoma cells at 104/well density. The degraded sample products are incubated with the cells for 48 hours. The results of the assay may be plotted as % relative growth vs. concentration of degraded sample in the tissue culture well. In addition, monomers, polymers, polymer structures and formulations of the present invention may also be evaluated by well-known in vivo tests, such as subcutaneous implantation in rats to confirm that they do not cause significant levels of irritation or inflammation at the subcutaneous implantation sites. Acceptable levels of toxicity are as known in the art.

The terms "active agent," "pharmaceutically active agent" and "biologically active agent" are used interchangeably herein to refer to a chemical or biological compound that induces a desired physical, pharmacological or physiological effect, wherein the effect may be prophylactic or therapeutic. The terms also encompass pharmaceutically acceptable, pharmacologically active derivatives of those active agents specifically mentioned herein, including, but not limited to, salts, esters, amides, prodrugs, active metabolites, analogs and the like. When the terms "active agent," "pharmacologically active agent" and "drug" are used, then, it is to be understood that the invention includes the active agent per se as well as pharmaceutically acceptable, pharmacologically active salts, esters, amides, prodrugs, metabolites, analogs etc. As described herein, a biologically active agent includes a living entity, such as a virus, microbe or cell.

The term "target entity" refers to a surface, cell, tissue, organ, biological structure, prosthesis, device, medical structure and the like to which a polymer of interest interacts, reacts and adheres. The target entity is of biological origin or is biologically compatible. A "biological surface" is the external, environmentally exposed portion of a biological entity, such as a microbe, virus, cell, tissue, organ and the like.

The term "biodegradable" is art-recognized and is intended to indicate that an object degrades during use. In general, degradation attributable to biodegradability involves the degradation of a biodegradable polymer into oligomers or its component subunits, or digestion, e.g., by a biochemical process, of the polymer into smaller subunits. In certain embodiments, two different types of biodegradation may generally be identified. For example, one type of biodegradation may involve cleavage of bonds (whether covalent or otherwise) in the polymer backbone. In such biodegradation, monomers and oligomers typically result, and even more typically, such biodegradation occurs by cleavage of a bond connecting one or more of subunits of a polymer. In contrast, another type of biodegradation may involve cleavage of a bond (whether covalent or otherwise) internal to a side chain or that connects a side chain to the polymer backbone. The side chain may be the functional moiety. For example, a therapeutic agent, biologically active agent or other chemical moiety attached as a side chain to the polymer backbone may be released by biodegradation. In certain embodiments, one or the other or both general types of biodegradation may occur during use of a polymer of interest. As used herein, the term "biodegradation" encompasses both general types of biodegradation as the overall desired function of the functionalized polymer of interest wanes.

The degradation rate of a biodegradable polymer often depends in part on a variety of factors, including the chemical identity of linkages; the molecular weight, crystallinity, biostability and degree of cross-linking of such polymer; the physical characteristics of the implant, such as the shape and size; the mode and location of administration; and so on. For example, the greater the molecular weight, the higher the degree of crystallinity, and/or the greater the biostability, the biodegradation of any biodegradable polymer is usually slower. The term "biodegradable" is intended to cover materials and processes also termed "bioerodible". Generally, the rate of degradation is a design choice based on the monomers, functional groups, added ingredients and the like that are used.

In certain embodiments, the biodegradation rate of such polymer may be characterized by the presence of enzymes, for example, a particular protease, lipase, saccharidase and so on. In such circumstances, the biodegradation rate may depend on not only the chemical identity and physical characteristics of the polymer matrix, but also on the identity, use, presence and the like of any such enzyme.

"Electromagnetic radiation" as used in this specification includes, but is not limited to, radiation having a wavelength of $10^{-20}$ to 10 meters. Particular embodiments of electromagnetic radiation of the instant invention employ the electromagnetic radiation of: γ radiation ($10^{-20}$ to $10^{-13}$ m), x-ray radiation ($10^{-11}$ to $10^{-9}$ m), ultraviolet light (10 to 400 nm), visible light (400 to 700 nm), infrared radiation (700 nm to 1 mm) and microwave radiation (1 mm to 30 cm).

The term "functionalized" refers to a modification of an existing molecular entity, structure or site to generate or to introduce a new reactive or more reactive group (e.g., acrylate group) that is capable of undergoing reaction with another functional group (e.g., a sulfhydryl group) to form, for example, a covalent bond. For example, carboxylic acid groups can be functionalized by reaction with an acyl halide, e.g., an acyl chloride, again, using known procedures, to provide a new reactive functional group in the form of an anhydride.

The term "hydrogel" is used to refer to a water-swellable polymeric matrix that can absorb water to form elastic gels, wherein a "matrix" is a three-dimensional networks of macromolecules held together by covalent or noncovalent crosslinks. On placement in an aqueous environment, dry hydrogels swell to the extent allowed by the degree of crosslinking. Alternatively, a hydrogel can be hydrated prior to use. The amount of water absorbed can be controlled by the macromolecule used. A hydrogel can carry a biologically active agent or a pharmaceutically active agent therein. Procedures for making a hydrogel that entraps and carries an agent are known in the art.

The term "instructional material" or "instructions" includes a publication, a recording, a diagram or any other medium of expression which can be used to communicate the usefulness of a subject composition described herein for a method of treatment or a method of making or using a subject composition. The instructional material may, for example, be affixed to a container which contains the composition or be shipped together with a container which contains the composition or be contained in a kit with the composition. Alternatively, the instructional material may be shipped separately from the container with the intention that the instructional material and the composition be used cooperatively by the recipient.

The term "polymer" is used to refer to molecules composed of repeating monomer units, including homopolymers, block copolymers, heteropolymers, random copolymers, graft-copolymers and so on. Polymers also include linear polymers as well as branched polymers, with branched polymers including highly branched, dendritic and star polymers.

A "monomer" is the basic repeating unit in a polymer. A monomer may itself be a monomer or may be dimer or oligomer of at least two different monomers, and each dimer or oligomer is repeated in a polymer.

A "polymerizing initiator" refers to any substance that can initiate polymerization of monomers or polymers by, for example, free radical generation. The polymerizing initiator often is an oxidizing agent. Exemplary polymerizing initiators include those which are activated by exposure to, for example electromagnetic radiation or heat.

The term "aliphatic" is an art-recognized term and includes linear, branched and cyclic alkanes, alkenes or alkynes. In certain embodiments, aliphatic groups in the present invention are linear or branched and have from 1 to about 20 carbon atoms, or more.

The term "alkyl" is art-recognized and includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has about 30 or fewer carbon atoms in its backbone (e.g., C1-C30 for straight chain and C3-C30 for branched chain), and alternatively, about 20 or fewer carbon atoms. Likewise, cycloalkyls have from about 3 to about 10 carbon atoms in their ring structure, and alternatively, about 5, 6 or 7 carbons in the ring structure.

Moreover, the term "alkyl" (or "lower alkyl") includes both "unsubstituted alkyls" and "substituted alkyls", the latter of which refers to alkyl moieties having substituents replacing a hydrogen on one or more carbons of the hydrocarbon backbone. Such substituents may include, for example, a halogen, a hydroxyl, a carbonyl (such as a carboxyl, an alkoxycarbonyl, a formyl or an acyl), a thiocarbonyl (such as a thioester, a thioacetate or a thioformate), an alkoxyl, a phosphoryl, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate) and silyl groups, as well as ethers, alkylthios, carbonyls (including ketones, aldehydes, carboxylates and esters), —CF3, —CN and the like. Exemplary substituted alkyls are described below. Cycloalkyls may be further substituted with alkyls, alkenyls, alkoxys, alkylthios, aminoalkyls, carbonyl-substituted alkyls, —CF3, —CN and the like.

The term "aralkyl" is art-recognized and includes aryl groups (e.g., an aromatic or heteroaromatic group).

The terms "alkenyl" and "alkynyl" are art-recognized and include unsaturated aliphatic groups analogous in length and possible substitution of the alkyls described above, but that contain at least one double or triple bond, respectively.

Unless the number of carbons is otherwise specified, "lower alkyl" refers to an alkyl group, as defined above, but having from one to ten carbons, alternatively, from one to about six carbon atoms in the backbone structure. Likewise, "lower alkenyl" and "lower alkynyl" have similar chain lengths.

A "methacrylate" refers to a vinylic carboxylate, for example, a methacrylic acid in which the acidic hydrogen has been replaced. Representative methacrylic acids include acrylic, methacrylic, chloroacrylic, cyano acrylic, ethylacrylic, maleic, fumaric, itaconic and half esters of the latter dicarboxylic acids.

The term "heteroatom" is art-recognized and in an organic molecule, generally includes an atom of any element other than carbon or hydrogen. Illustrative heteroatoms include boron, nitrogen, oxygen, phosphorus, sulfur and selenium.

The term "aryl" is art-recognized and includes, for example, 5-, 6- and 7-membered single ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine and the like. Those aryl groups having heteroatoms in the ring structure may also be referred to as "aryl heterocycles" or "heteroaromatics." The aromatic ring may be substituted at one or more ring-positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls, or rings joined by non-cyclic moieties.

The terms "ortho", "meta" and "para" are art-recognized and apply to 1,2-, 1,3- and 1,4-disubstituted benzenes, respectively. For example, the names 1,2-dimethylbenzene and ortho-dimethylbenzene are synonymous.

The terms "heterocyclyl" and "heterocyclic group" are art-recognized and include 3- to about 10-membered ring structures, such as 3- to about 7-membered rings, whose ring structures include one to four heteroatoms. Heterocycles may also be polycycles. Heterocyclyl groups include, for example, thiophene, thiantlirene, furan, pyran, isobenzofuran, chromene, xanthene, phenoxanthin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams, such as azetidinones and pyrrolidinones, sultams, sultones and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN or the like.

The terms "polycyclyl" and "polycyclic group" are art-recognized and include structures with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms, e.g., three or more atoms are common to both rings, are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN or the like.

The following art-recognized terms have the following meanings: "nitro" means —NO2; the term "halogen" designates —F, —Cl, —Br or —I; the term "sulfhydryl" means —SH; the term "hydroxyl" or "hydroxy" means —OH; and the term "sulfonyl" means —SO2-.

The terms "amine" and "amino" are art-recognized and include both unsubstituted and substituted amines, e.g., a moiety that may be represented by the following formulae, wherein R50, R51, R52 and R53 each independently represents a hydrogen, an alkyl, an alkenyl or —(CH2)$_m$—R61; or R50 and R51, taken together with the N atom to which they are attached complete a heterocycle having from 4 to 8 atoms in the ring structure; R61 represents an aryl, a cycloalkyl, a cycloalkenyl, a heterocycle or a polycycle; m is zero or an integer in the range of 1 to 8, and in certain embodiments, only one of R50 or R51 may be a carbonyl, e.g., R50, R51 and the nitrogen together do not form an imide, and, R50 and R51 (and optionally R52) each independently represent a hydrogen, an alkyl, an alkenyl, or —(CH2)m-R61:

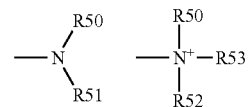

Thus, the term "alkylamine" includes an amine group, as defined above, having a substituted or unsubstituted alkyl attached thereto, i.e., at least one of R50 and R51 is an alkyl group.

The term "acylamino" is art-recognized and includes a moiety that may be represented by the following general formula, wherein R50 is as defined above, and R54 represents a hydrogen, an alkyl, an alkenyl or —(CH2)m-R61, wherein m and R61 are as defined above:

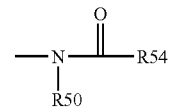

The term "amido" is art-recognized as an amino-substituted carbonyl and includes a moiety that may be represented by the following general formula, wherein R50 and R51 are as defined above, and certain embodiments of the amide in the present invention will not include imides which may be unstable:

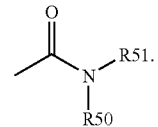

The term "alkylthio" is art-recognized and includes an alkyl group, as defined above, having a sulfur radical attached thereto. In certain embodiments, the "alkylthio" moiety is represented by one of —S-alkyl, —S-alkenyl, —S-alkynyl and —S—(CH2)m-R61 wherein m and R61 are as defined above. Representative alkylthio groups include methylthio, ethylthio and the like.

The term "carbonyl" is art-recognized and includes such moieties as may be represented by the following general formulae, wherein X50 is a bond or represents an oxygen or a sulfur, R55 represents a hydrogen, an alkyl, an alkenyl, —(CH2)m-R61 or a pharmaceutically acceptable salt, and R56 represents a hydrogen, an alkyl, an alkenyl or —(CH2)m-R61, wherein m and R61 are defined above, and when X50 is an oxygen and R55 or R56 is not hydrogen, the formula represents an "ester"; when X50 is an oxygen, and R55 is as defined above, the moiety is referred to herein as a carboxyl group, and particularly when R55 is a hydrogen, the formula represents a "carboxylic acid"; when X50 is an oxygen and R56 is hydrogen, the formula represents a "formate"; in general, when the oxygen atom of the above formula is replaced by sulfur, the formula represents a "thiocarbonyl" group; when X50 is a sulfur and R55 or R56 is not hydrogen, the formula represents a "thioester."; when X50 is a sulfur and R55 is hydrogen, the formula represents a "thiocarboxylic acid."; when X50 is a sulfur and R56 is hydrogen, the formula represents a "thioformate."; when X50 is a bond and R55 is not hydrogen, the following formula represents a "ketone" group; and when X50 is a bond, and R55 is hydrogen, the following formula represents an "aldehyde" group:

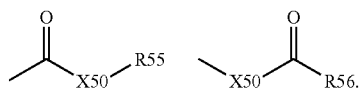

The terms "alkoxyl" or "alkoxy" are art-recognized and include an alkyl group, as defined above, having an oxygen radical attached thereto. Representative alkoxyl groups include methoxy, ethoxy, propyloxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl or —O—(CH2)m-R61, where m and R61 are described above.

The term "sulfonate" is art-recognized and includes a moiety that may be represented by the general formula, in which R57 is an electron pair, hydrogen, alkyl, cycloalkyl or aryl:

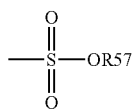

The term "sulfate" is art-recognized and includes a moiety that may be represented by the general formula, in which R57 is as defined above:

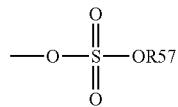

The term "sulfonamido" is art-recognized and includes a moiety that may be represented by the general formula, in which R50 and R56 are as defined above:

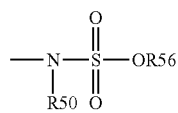

The term "sulfamoyl" is art-recognized and includes a moiety that may be represented by the general formula, wherein R50 and R51 are as defined above:

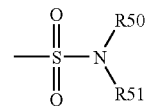

The term "sulfonyl" is art-recognized and includes a moiety that may be represented by the general formula, in which R58 is one of hydrogen, alkyl, alkenyl, alkynyl, cycloalkyl, heterocyclyl, aryl or heteroaryl:

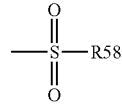

The term "sulfoxido" is art-recognized and includes a moiety that may be represented by the general formula, with R58 as defined above:

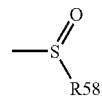

The term "phosphoramidite" is art-recognized and includes moieties represented by the general formulae, wherein R50 and R51 is as defined above, and R59 is the same as R57, as defined above, and Q51 is an atom or a bond:

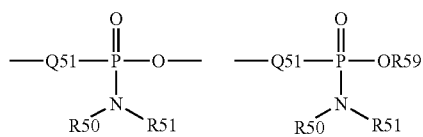

The term "phosphonamidite" is art-recognized and includes moieties represented by the general formulae, wherein R50, R51, Q51 and R59 are as defined above, and R60 represents a lower alkyl or an aryl:

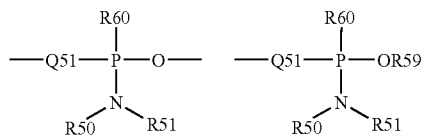

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

The definition of each expression, e.g. alkyl, aryl etc., when it occurs more than once in any structure, is intended to be independent of its definition elsewhere in the same structure unless otherwise indicated expressly or by the context.

The term "selenoalkyl" is art-recognized and includes an alkyl group having a substituted seleno group attached thereto. Exemplary "selenoethers" which may be substituted on the alkyl are selected from one of —Se-alkyl, —Se-alkenyl, —Se-alkynyl and —Se—(CH2)m-R61-, wherein m and R61 are as defined above.

The terms triflyl, tosyl, mesyl and nonaflyl are art-recognized and refer to trifluoromethanesulfonyl, p-toluenesulfonyl, methanesulfonyl and nonafluorobutanesulfonyl groups, respectively. The terms triflate, tosylate, mesylate and nonaflate are art-recognized and refer to trifluoromethanesulfonate ester, p-toluenesulfonate ester, methanesulfonate ester and nonafluorobutanesulfonate ester functional groups and molecules that contain said groups, respectively.

The abbreviations Me, Et, Ph, Tf, Nf, Ts, and Ms are art-recognized and represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; that list is typically presented in a table entitled Standard List of Abbreviations.

Certain monomeric subunits of the present invention may exist in particular geometric or stereoisomeric forms. In addition, polymers and other compositions of the present invention may also be optically active. The present invention contemplates all such compounds, including cis and trans isomers, R and S enantiomers, diastereomers, d isomers, l isomers, the racemic mixtures thereof, and other mixtures thereof, as falling within the scope of the invention. Additional asymmetric carbon atoms may be present in a substituent, such as an alkyl group. All such isomers, as well as mixtures thereof, are intended to be included in this invention.

If, for instance, a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino or an acidic functional group, such as carboxyl, diastereomeric salts are formed with an appropriate optically active acid or base, followed by resolution of the diastereomers thus formed by fractional crystallization or chromatographic means well known in the art, and subsequent recovery of the pure enantiomers.

It will be understood that "substitution" or "substituted with" includes the implicit proviso that such substitution is in accordance with the permitted valency of the substituted atom and the substituent, and that the substitution results in a stable compound, e.g., which does not spontaneously undergo transformation, such as by rearrangement, cyclization, elimination or other reaction.

The term "substituted" is also contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described hereinabove. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

For purposes of this invention, the chemical elements are identified in accordance with the Periodic Table of the Elements, CAS version, Handbook of Chemistry and Physics, 67th Ed., 1986-87, inside cover.

In some embodiments, the disclosure is directed to a composition comprising a glycosaminoglycan, mucopolysaccharide, collagen or proteoglycan component, such as hyaluronic acid, heparin sulfate, glucosamines, dermatans, keratans, heparans, hyalurunan, aggrecan and the like, or a saccharide, such as hyaluronic acid, heparin sulfate, keratan sulfate and the like, functionalized by at least two different reactive moieties. Those polysaccharides are natural components of extracellular matrices of cells and tissues. However, in general, any biologically compatible polymer can be used as the polymer, which polymer carries at least two kinds of reactive, functional groups.

Synthetic polymers that are biocompatible also can be used in the practice of the instant invention. Examples of such synthetic, biocompatible polymers are polyethylene glycol (PEG), polyvinyl alcohol (PVA) and block copolymers, such as the Pluronic compounds.

Suitable polymers include biocompatible monomers with recurring units found in poly(phosphoesters), poly(lactides), poly(glycolides), poly(caprolactones), poly(anhydrides), poly(amides), poly(urethanes), poly(esteramides), poly(orthoesters), poly(dioxanones), poly(acetals), poly(ketals), poly(carbonates), poly(orthocarbonates), poly(phosphazenes), poly(hydroxybutyrates), poly(hydroxyl valerates), poly(alkylene oxalates), poly(alkylene succinates), poly(malic acids), poly(amino acids), poly(vinylpyrrolidone), poly(ethylene glycol), poly(hydroxycellulose), chitin and chitosan, and copolymers, terpolymers or combinations or mixtures of the above materials.

Other suitable synthetic polymers include polymers containing amine groups, such as chemically synthesized polypeptides. For example, a copolymer of vinyl alcohol and vinyl amine can be used as a polymer with multiple reactive sites. Such polypeptides may include polynucleophilic polypeptides that have been synthesized to incorporate amino acids containing primary amino groups for example, lysine and/or amino acids containing thiol groups (such as cysteine). Further suitable synthetic polymers include poly(amino)acids.

A polymer to be functionalized, or monomers thereof, can be obtained from commercial sources, extracted from natural sources using known methods or synthesized from monomers or oligomers, either made or purified as known in the art, or purchased.

A reactive moiety includes any moiety that reacts with a suitable element, chemical group or chemical site on a target entity. One set of target entities are biological structures, such as cells, tissues, organs and the like. A functional group on the biologically compatible polymer reactive with a biological surface moiety includes any functional group that reacts with a suitable element, chemical group or chemical site on a surface of a biological structure, such as a cell, tissue, organ and the like. Thus, a suitable element, chemical group or chemical site on the surface of a biological structure would be a reactive group found in, for example, a carbohydrate, an amino acid or a nucleic acid, such as an amine group, a carboxylic acid group, a hydroxyl group, a sulfate group and so on. Accordingly, a suitable reactive moiety would be one that reacts with an amine group, a hydroxyl group and so on of the surface of a biological structure. A suitable functional group would be one that reacts with an amine group, a hydroxyl group and so on of the surface of a biological structure. An example is an aldehyde group.

Other reactive moieties are those which react with elements, chemical groups or chemical sites on biologically compatible materials, such as implants, prostheses, other devices and the like.

Other functional groups on the biologically compatible polymer are those which react with elements, chemical groups or chemical sites on the bridging molecule.

A reactive moiety or functional group (which terms, for the purposes of the invention, are considered equivalent) may include alkenyl moieties such as acrylates, methacrylates, dimethacrylates, oligoacrylates, oligomethacrylates, ethacrylates, itaconates or acrylamides. Further reactive moieties include carboxylates and aldehydes. Other reactive moieties may include ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene malonates, isoprene and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid and styrene carboxylic acid. Suitable polyethylenically unsaturated monomers include butadiene, isoprene, allylmethacrylate, diacrylates of alkyl diols such as butanediol diacrylate and hexanediol diacrylate, divinyl benzene and the like.

In some embodiments, a monomer of a biologically compatible polymer may be functionalized through one or more thio, carboxylic acid or alcohol moiety located on a monomer of the biopolymer.

The reactive moieties or functional groups are attached to the monomer or biologically compatible polymer using known chemistries based on design choice.

Thus, in producing, for example, a functionalized saccharide, a solution comprising the saccharide and a first functional group reactant, such as an alkylene or an acrylate group, are mixed. The solution is stirred, for example, for at least 10 days, at least 11 days or at least 15 days. Alternatively, the solution may be stirred or maintained for about 10 to about 15 days or about 14 to about 15 days. The solution may include a polar solvent, for example an aqueous solvent.

For example, methacrylic anhydride, methacryloyl chloride and glycidyl methacrylate may be used to add methacrylate groups to one or more monomers of a polymer chain. Glycidyl methacrylate may be used, for example, for efficiency of reaction. Further, the modification reagents may be chosen to optimize for a lack of cytotoxic byproducts.

A suitable method for making a polymer with aldehyde groups is to treat a molecule with adjacent hydroxyl groups, such as chondroitin sulfate, with a periodate salt, as known in the art.

In some embodiments, the number of each of the at least two reactive moieties per polymeric unit may be at least one moiety per about 10 monomeric units, or at least about 2 moieties per about 10 monomeric units. Alternatively, the number of reactive moieties per polymeric unit may be at least one moiety per about 12 monomeric units, or per about 14 monomeric units. For example, there may be at least about one reactive moiety per 15 or more monomeric units. The number of moieties also can range from one per monomer, one per two monomers, one per three monomers, one per 4, 5, 6, 7, 8 or 9 monomers.

Also, the ratio of one of the two reactive moieties to the other can be 5:1, 9:2, 4:1, 7:2, 3:1, 5:2, 2:1, 3:2, 1:1, 2:3, 1:2, 2:5, 1:3, 2:7, 1:4, 2:9 or 1:5 along the full length of the polymer. Preferably, each of the functional moieties is regularly distributed along the length of the polymer and in substantially equal molar amounts. However, the amount of any one reactive moiety type is optimized for reaction with the intended target entity and may result in amounts where the ratio of the two types of reactive moieties deviates from unity.

The biologically compatible polymer of the invention can also comprise additional biocompatible monomers or polymers so long as there is no interference with the desirable characteristics of the invention. Such additional monomers and polymers may offer even greater flexibility in designing the precise profile desired for, for example, targeted drug delivery, tissue engineering, enhanced administration or the precise rate of biodegradability or biocompatibility desired. Thus, for example, the polymer or a hydrogel of interest can contain, for example, collagen.

In another embodiment, a method of producing a polymer or a multiple layer polymer is provided. A suitable monomer or polymer is exposed to at least one polymerizing initiator whereby producing a polymer or multi-layer polymer of interest. The reactive moiety for polymerizing monomers can also be one of the said at least two different reactive moieties of a polymer of interest. The reactive moiety for polymerizing monomers can be the functional group for binding to the biological surface.

A polymerization reaction of the present invention can be conducted by conventional methods such as mass polymerization, solution (or homogeneous) polymerization, suspension polymerization, emulsion polymerization, radiation polymerization (using x-ray, electron beam or the like) or the like.

Polymerizing initiators include electromechanical radiation. Initiation of polymerization may be accomplished by irradiation with light at a wavelength of between about 200 to about 700 nm, or above about 320 nm or higher, or even about 365 nm. In some embodiments, the light intensity is about 4 mW/cm2.

Examples of other initiators are organic solvent-soluble initiators such as benzoyl peroxide, azobisisobutyronitrile (AIBN), dibutyl and tertiary butyl peroxide and the like, water soluble initiators such as ammonium persulfate (APS), potassium persulfate, sodium persulfate, sodium thiosulfate and the like, redox-type initiators which are combinations of such initiators and tetramethylethylene, Fe2+ salt, sodium hydrogen sulfite or like reducing agent.

Useful photoinitiators are those which can be used to initiate by free radical generation polymerization of monomers with minimal cytotoxicity. In some embodiments, the initiators may work in a short time frame, for example, minutes or seconds. Exemplary dyes for UV or visible light initiation include ethyl eosin 2,2-dimethoxy-2-phenyl acetophenone, 2-methoxy-2-phenylacetophenone, other acetophenone derivatives and camphorquinone. Another example is Irgacure 2959, CAS No. 106797-53-9, U.S. Pat. No. 4,861,916. In all cases, crosslinking and polymerization are initiated by a light-activated free-radical polymerization initiator such as 2,2-dimethoxy-2-phenylacetophenone or a combination of ethyl eosin and triethanol amine, for example.

Other photooxidizable and photoreducible dyes that may be used to initiate polymerization include acridine dyes, for example, acriblarine; thiazine dyes, for example, thionine; xanthine dyes, for example, rose bengal; and phenazine dyes, for example, methylene blue. These may be used with cocatalysts such as amines, for example, triethanolamine; sulphur compounds; heterocycles, for example, imidazole; enolates; organometallics; and other compounds, such as N-phenyl glycine. Other initiators include camphorquinones and acetophenone derivatives.

Thermal polymerization initiator systems may also be used. Such systems that are unstable at 37° C. and would initiate free radical polymerization at physiological temperatures include, for example, potassium persulfate, with or without tetramethyl ethylenediamine; benzoylperoxide, with or without triethanolamine; and ammonium persulfate with sodium bisulfite.

One of the target entities of the present invention may include, for examples, hydrogels. Thus, the adhesive of interest may serve to adhere a hydrogel to a biological surface, such as a cell, tissue or organ, as well as an artificial surface, such as that of a prosthesis.

For example; poly(ethylene oxide)-diacrylate (PEODA) may be used, and cross-linked polymer matrices may include cogels of CS-MA (chondroitin sulfate and methacrylate) and PEODA. The CS-MA hydrogels may absorb more water than the PEODA hydrogels, thus, increasing the percentage of CS-MA in the cogels increases the water content.

The mechanical properties of a polymer or a multi-layer polymer, such as a scaffold, may also be related to the pore structure. For applications in tissue engineering, scaffolds with different mechanical properties are produced depending on the desired clinical application. For example, scaffolds for cartilage tissue engineering in the articular joint must survive higher mechanical stresses than a cartilage tissue engineering system in other body sites. Thus, hydrogels with mechanical properties that are easily manipulated may be desired.

The rheological properties of PEODA and CS-MA are similar and the copolymerization does not alter the properties significantly. Cogels with higher portion of PEODA (100% and 75%) have a higher mechanical strength while cogels with 25% and 0% PEODA exhibit a decrease. The PEODA gels are more highly cross-linked than the CS-MA gel.

Cytotoxicity of the biopolymer scaffold system may be evaluated with any suitable cells, such as fibroblasts, by, for example, using a live-dead fluorescent cell assay and MTT, a compound that actively metabolizing cells convert from yellow to purple.

Certain combinations of functional groups can be used without a polymerizing initiator. If the biological surface has a plurality of reactive amine sites, a suitable functional group of the biologically compatible polymer is an aldehyde group which can react with the amines to form a covalent bond via a Schiff reaction.

In one aspect of this invention, a composition comprising a polymer of interest, a multilayer polymer of interest or an entity attached to a polymer of interest may contain one or more biologically active agents. The biologically active agent may vary widely with the intended purpose for the composition. The term "active" is art-recognized and refers to any chemical moiety that is a biologically, physiologically, or pharmacologically active substance that acts locally or systemically in a subject. Examples of biologically active agents, that may be referred to as "drugs", are described in well-known literature references such as the Merck Index, the Physicians Desk Reference and The Pharmacological Basis of Therapeutics, and include, without limitation, medicaments; vitamins; mineral supplements; substances used for the treatment, prevention, diagnosis, cure or mitigation of a disease or illness; substances which affect the structure or function of the body; or pro-drugs, which become biologically active or more active after they have been placed in a physiological environment. Various forms of a biologically active agent may be used which are capable of being released by the subject composition, for example, into adjacent tissues or fluids on administration to a subject.

In another aspect of this invention, a composition comprising a biologically compatible polymer of interest, a multilayer polymer of interest, a bridging molecule, a multiple layer bridging molecule of interest or an entity attached to a polymer or bridging molecule of interest may contain one or more biologically active agents.

Further examples of biologically active agents include, without limitation, enzymes, receptor antagonists or agonists, hormones, growth factors, autogenous bone marrow, antibiotics, antimicrobial agents and antibodies. The term "biologically active agent" is also intended to encompass various cell types and genes that can be incorporated into the compositions of the invention.

In certain embodiments, the subject compositions comprise about 1% to about 75% or more by weight of the total composition, alternatively about 2.5%, 5%, 10%, 20%, 30%, 40%, 50%, 60%, 70% or more, of a biologically active agent.

Non-limiting examples of biologically active agents include following: adrenergic blocking agents, anabolic agents, androgenic steroids, antacids, anti-asthmatic agents, anti-allergenic materials, anti-cholesterolemic and anti-lipid agents, anti-cholinergics and sympathomimetics, anti-coagulants, anti-convulsants, anti-diarrheal, anti-emetics, anti-hypertensive agents, anti-infective agents, anti-inflammatory agents such as steroids, non-steroidal anti-inflammatory agents, anti-malarials, anti-manic agents, anti-nauseants, anti-neoplastic agents, anti-obesity agents, anti-parkinsonian agents, anti-pyretic and analgesic agents, anti-spasmodic agents, anti-thrombotic agents, anti-uricemic agents, anti-anginal agents, antihistamines, anti-tussives, appetite suppressants, benzophenanthridine alkaloids, biologicals, cardioactive agents, cerebral dilators, coronary dilators, decongestants, diuretics, diagnostic agents, erythropoietic agents, estrogens, expectorants, gastrointestinal sedatives, agents, hyperglycemic agents, hypnotics, hypoglycemic agents, ion exchange resins, laxatives, mineral supplements, mitotics, mucolytic agents, growth factors, neuromuscular drugs, nutritional substances, peripheral vasodilators, progestational agents, prostaglandins, psychic energizers, psychotropics, sedatives, stimulants, thyroid and anti-thyroid agents, tranquilizers, uterine relaxants, vitamins, antigenic materials and pro-drugs.

Specific examples of useful biologically active agents the above categories include: (a) anti-neoplastics such as androgen inhibitors, antimetabolites, cytotoxic agents and immunomodulators; (b) anti-tussives such as dextromethorphan, hydrobromide, noscapine, carbetapentane citrate and chlophedianol hydrochloride; (c) antihistamines such as chlorpheniramine phenindamine tartrate, pyrilamine doxylamine succinate and phenyltoloxamine citrate; (d) decongestants such as hydrochloride, phenylpropanolamine hydrochloride, pseudoephedrine hydrochloride and ephedrine; (e) various alkaloids such as codeine phosphate, codeine sulfate and morphine; (f) mineral supplements such as potassium chloride, zinc chloride, calcium carbonate, magnesium oxide and other alkali metal and alkaline earth metal salts; (g) ion exchange resins; (h) antipyretics and analgesics such as acetaminophen, aspirin and ibuprofen; (i) appetite suppressants such as phenyl-propanolamine or caffeine; (j) expectorants such as guaifenesin; (k) antacids such as aluminum hydroxide and magnesium hydroxide; (l) biologicals such as peptides, polypeptides, proteins and amino acids, hormones, interferons, cytokines and other bioactive peptidic compounds, such as calcitonin, ANF, EPO and insulin; (m) anti-infective agents such as anti-fungals, anti-virals, antiseptics and antibiotics; and (n) desensitizing agents and antigenic materials, such as those useful for vaccine applications.

More specifically, non-limiting examples of useful biologically active agents include the following therapeutic categories: analgesics, such as nonsteroidal anti-inflammatory drugs, opiate agonists and salicylates; antihistamines, such as H1-blockers and H2-blockers; anti-infective agents, such as antihelmintics, antianaerobics, antibiotics, aminoglycoside antibiotics, antifungals, cephalosporin antibiotics, macrolide antibiotics, miscellaneous antibiotics, penicillin antibiotics, quinolone antibiotics, sulfonamide antibiotics, tetracycline antibiotics, antimycobacterials, antituberculosis antimycobacterials, antiprotozoals, antimalarial antiprotozoals, antiviral agents, anti-retroviral agents, scabicides and urinary anti-infectives; antineoplastic agents, such as alkylating agents, nitrogen mustard alkylating agents, nitrosourea alkylating agents, antimetabolites, purine analog antimetabolites, pyrimidine analog antimetabolites, hormonal antineoplasties, natural antineoplastics, antibiotic natural antineoplastics and vinca alkaloid natural antineoplastics; autonomic agents, such as anticholinergics, antimuscarinic anticholinergics, ergot alkaloids, parasympathomimetics, cholinergic agonist parasympathomimetics, cholinesterase inhibitor parasympathomimetics, sympatholytics, α-blocker sympatholytics, sympatholytics, sympathomimetics and adrenergic agonist sympathomimetics; cardiovascular agents, such as antianginals, antianginals, calcium-channel blocker antianginals, nitrate antianginals, antiarrhythmics, cardiac glycoside antiarrhythmics, class I antiarrhythmics, class II antiarrhythmics, class III antiarrhythmics, class IV antiarrhythmics, antihypertensive agents, α-blocker antihypertensives, angiotensin-converting enzyme inhibitor (ACE inhibitor) antihypertensives, 13-blocker antihypertensives, calcium-channel blocker antihypertensives, central-acting adrenergic antihypertensives, diuretic antihypertensive agents, peripheral vasodilator antihypertensives, antilipemics, bile acid sequestrant antilipemics, reductase inhibitor antilipemics, inotropes, cardiac glycoside inotropes and thrombolytic agents; dermatological agents, such as antihistamines, anti-inflammatory agents, corticosteroid anti-inflammatory agents, anesthetics, topical anti-infectives, topical anti-infectives, antiviral topical anti-infectives and topical antineoplastics; electrolytic and renal agents, such as acidifying agents, alkalinizing agents, diuretics, carbonic anhydrase inhibitor diuretics, loop diuretics, osmotic diuretics, potassium-sparing diuretics, thiazide diuretics, electrolyte replacements and uricosuric agents; enzymes, such as pancreatic enzymes and thrombolytic enzymes; gastrointestinal agents, such as antidiarrheals, antiemetics, gastrointestinal anti-inflammatory agents, salicylate gastrointestinal anti-inflammatory agents, antacid anti-ulcer agents, gastric acid-pump inhibitor anti-ulcer agents, gastric mucosal anti-ulcer agents, H2-blocker anti-ulcer agents, cholelitholytic agents, digestants, emetics, laxatives and stool softeners, and prokinetic-agents; general anesthetics, such as inhalation anesthetics, halogenated inhalation anesthetics, intravenous anesthetics, barbiturate intravenous anesthetics, benzodiazepine intravenous anesthetics and opiate agonist intravenous anesthetics; hematological agents, such as anti-anemia agents, hematopoietic antianemia agents, coagulation agents, anticoagulants, hemostatic coagulation agents, platelet inhibitor coagulation agents, thrombolytic enzyme coagulation agents and plasma volume expanders; hormones and hormone modifiers, such as abortifacients, adrenal agents, corticosteroid adrenal agents, androgens, anti-androgens, antidiabetic agents, sulfonylurea antidiabetic agents, antihypoglycemic agents, oral contraceptives, progestin contraceptives, estrogens, fertility agents, oxytocics, parathyroid agents, pituitary hormones, progestins, antithyroid agents, thyroid hormones and tocolytics; immunobiologic agents, such as immunoglobulins, immunosuppressives, toxoids and vaccines; local anesthetics, such as amide local anesthetics and ester local anesthetics; musculoskeletal agents, such as anti-gout anti-inflammatory agents, corticosteroid anti-inflammatory agents, gold compound anti-inflammatory agents, immunosuppressive anti-inflammatory agents, nonsteroidal anti-inflammatory drugs (NSAIDs), salicylate anti-inflammatory agents, skeletal muscle relaxants, neuromuscular blocker skeletal muscle relaxants, reverse neuromuscular blocker skeletal muscle relaxants; neurological agents, such as anticonvulsants, barbiturate anticonvulsants, benzodiazepine anticonvulsants, anti-migraine agents, anti-parkinsonian agents, anti-vertigo agents, opiate agonists and opiate antagonists; ophthalmic agents, such as anti-glaucoma agents, anti-glaucoma agents, mitotics, anti-glaucoma agents, mydriatics, adrenergic agonist mydriatics, antimuscarinic mydriatics, ophthalmic anesthetics, ophthalmic anti-infectives, ophthalmic aminoglycoside anti-infectives, ophthalmic macrolide anti-infectives, ophthalmic quinolone anti-infectives, ophthalmic sulfonamide anti-infectives, ophthalmic tetracycline anti-infectives, ophthalmic anti-inflammatory agents, ophthalmic corticosteroid anti-inflammatory agents and ophthalmic nonsteroidal anti-inflammatory drugs (NSAIDs); psychotropic agents, such as antidepressants, heterocyclic antidepressants, monoamine oxidase inhibitors selective serotonin reuptake inhibitors tricyclic antidepressants, antimanics, antipsychotics, phenothiazine antipsychotics, anxiolytics, sedatives and hypnotics, barbiturate sedatives and hypnotics, benzodiazepine anxiolytic sedatives and hypnotics, and psychostimulants; respiratory agents, such as antitussives, bronchodilators, adrenergic agonist bronchodilators, antimuscarinic bronchodilators, expectorants, mucolytic agents, respiratory anti-inflammatory agents and respiratory corticosteroid anti-inflammatory agents; toxicology agents, such as antidotes, heavy agents, substance abuse agents, deterrent substance abuse agents and withdrawal substance abuse agents; minerals; and vitamins, such as vitamin A, vitamin vitamin C, vitamin D, vitamin E and vitamin K.

Other classes of biologically active agents from the above categories include: (1) analgesics in general, such as lidocaine, other "caine" analgesics or derivatives thereof, and nonsteroidal anti-inflammatory drugs (NSAIDs) analgesics, including diclofenac, ibuprofen, ketoprofen and naproxen; (2) opiate agonist analgesics, such as codeine, fentanyl, hydromorphone and morphine; (3) salicylate analgesics, such as aspirin (ASA) (enteric coated ASA); (4) H1-blocker antihistamines, such as clemastine and terfenadine; (5) H2-blocker antihistamines, such as cimetidine, famotidine, nizadine and ranitidine; (6) anti-infective agents, such as mupirocin; (7) antianaerobic anti-infectives, such as chloramphenicol and clindarnycin; (8) antifungal antibiotic anti-infectives, such as amphotericin b, clotrimazole, fluconazole and ketoconazole; (9) macrolide antibiotic anti-infectives, such as azithromycin and erythromycin; (10) miscellaneous antibiotic anti-infectives, such as and imipenem; (11) penicillin antibiotic anti-infectives, such as nafcillin, oxacillin, penicillin G and penicillin V; (12) quinolone antibiotic anti-infectives, such as ciprofloxacin and norfloxacin; (13) tetracycline antibiotic anti-infectives, such as doxycycline, minocycline and tetracycline; (14) antituberculosis antimycobacterial anti-infectives such as isoniazid and rifampin; (15) antiprotozoal anti-infectives, such as atovaquone and dapsone; (16) antimalarial antiprotozoal anti-infectives, such as chloroquine and pyrimethamine; (17) antiretroviral anti-infectives, such as ritonavir and zidovudine; (18) antiviral anti-infective agents, such as acyclovir, ganciclovir, interferon-α and rimantadine; (19) alkylating antineoplastic agents, such as carboplatin and cisplatin; (20) nitrosourea alkylating antineoplastic agents, such as carmustine (BCNU); (21) antimetabolite antineoplastic agents, such as methotrexate; (22) pyrimidine analog antineoplastic agents, such as fluorouracil (5-FU) and gemcitabine; (23) hormonal antineoplastics, such as goserelin, leuprolide and tamoxifen; (24) natural antineoplastics, such as aldesleukin, interleukin-2, docetaxel, etoposide interferon α, paclitaxel, other taxane derivatives and tretinoin (ATRA); (25) antibiotic natural antineoplastics, such as bleomycin, dactinomycin, daunorubicin, doxorubicin and initomycin; (26) vinca alkaloid natural antineoplastics, such as vinblastine and vincristine; (27) autonomic agents, such as nicotine; (28) anticholinergic autonomic agents, such as benztropine and trihexyphenidyl; (29) antimuscarinic anticholinergic autonomic agents, such as atropine and oxybutynin; (30) ergot alkaloid autonomic agents, such as bromocriptine; (31) cholinergic agonist parasympathomimetics, such as pilocarpine; (32) cholinesterase inhibitor parasympathomimetics, such as pyridostigmine; (33) α-blocker sympatholytics, such as prazosin; (34) D-blocker sympatholytics, such as atenolol; (35) adrenergic sympathomimetics, such as albuterol and dobutamine; (36) cardiovascular agents, such as aspirin (ASA) (enteric coated ASA); (37) D-blocker antianginals, such as atenolol and propranolol; (38) calcium-channel blocker antianginals, such as nifedipine and verapamil; (39) nitrate antianginals, such as isosorbide dinitrate (ISDN); (40) cardiac glycoside antiarrythmics; (41) class I antiarrhythmics, such as lidocaine, mexiletine, phenyloin, procainamide and quinidine; (42) class II antiarrhythmics, such as atenolol, metoprolol, propranolol and timolol; (43) class III antiarrhythmics, such as amiodarone; (44) class IV antiarrhythmics, such as diltiazem and verapamil; (45) antihypertensives, such as prazosin; (46) angiotensin converting enzyme inhibitor (ACE inhibitor) antihypertensives, such as captopril and enalapril; (47) antihypertensives, such as atenolol, metoprolol, nadolol and propranolol; (48) calcium-channel blocker antihypertensive agents, such as diltiazem and nifedipine; (49) central-acting adrenergic antihypertensives, such as clonidine and methyldopa; (50) diuretic antihypertensive agents, such as amiloride, furosemide, hydrochlorothiazide (HCTZ), and spironolactone; (51) peripheral vasodilator antihypertensives, such as minoxidil; (52) antilipemics, such as gemfibrozil and probucol; (53) bile acid sequestrant antilipemics, such as cholestyramine; (54) reductase inhibitor antilipemics, such as lovastatin and pravastatin; (55) inotropes, such as amrinone, dobutamine and dopamine; (56) cardiac glycoside inotropes; (57) thrombolytic agents, such as alteplase (TPA), anistreplase, streptokinase and urokinase; (58) dermatological agents, such as colchicine, isotretinoin, methotrexate, minoxidil and tretinoin; (59) dermatological corticosteroid anti-inflammatory agents, such as betamethasone and dexamethasone; (60) antifungal topical anti-infectives, such as amphotericin clotrimazole, miconazole and nystatin; (61) antiviral topical anti-infectives, such as acyclovir; (62) topical antineoplastics; (63) electrolytic and renal agents, such as lactulose; (64) loop diuretics, such as furosemide; (65) potassium-sparing diuretics, such as triamterene; (66) thiazide diuretics, such as hydrochlorothiazide (HCTZ); (67) uricosuric agents, such as probenecid; (68) enzymes; (69) thrombolytic enzymes, such as alteplase, anistreplase, streptokinase and urokinase; (70) antiemetics, such as prochlorperazine; (71) salicylate gastrointestinal anti-inflammatory agents, such as sulfasalazine; (72) gastric acid-pump inhibitor anti-ulcer agents, such as omeprazole; (73) H2-blocker anti-ulcer agents, such as cimetidine, famotidine, nizatidine and ranitidine; (74) digestants, such as pancrelipase; (75) prokinetic agents, such as erythromycin; (76) opiate agonist intravenous anesthetics such as fentanyl; (77) hematopoietic antianemia agents, such as (G-CSF) and (GM-CSF); (78) coagulation agents, such as factors 1-10 (AHF 1-10); (79) anticoagulants, such as warfarin; (80) thrombolytic enzyme coagulation agents, such as alteplase, anistreplase, streptokinase and urokinase; (81) hormones and hormone modifiers, such as bromocriptine; (82) abortifacients, such as methotrexate; (83) antidiabetic agents, such as insulin; (84) oral contraceptives, such as estrogen and progestin; (85) progestin contraceptives, such as levonorgestrel and norgestrel; (86) estrogens such as conjugated estrogens, diethylstilbestrol (DES) and estrogen (estradiol, estrone and estropipate); (87) fertility agents, such as clomiphene, human chorionic gonadotropin (HCG) and menotropins; (88) parathyroid agents such as calcitonin; (89) pituitary hormones, such as desmopressin, goserelin, oxytocin and vasopressin (ADH); (90) progestins, such as medroxyprogesterone, norethindrone and progesterone; (91) thyroid hormones, such as levothyroxine; (92) immunobiologic agents, such as interferon β-1b and interferon γ-1b; (93) immunoglobulins, such as immune globulin IM, IMIG, IGIM, IVIG and IGIV; (94) amide local anesthetics, as lidocaine; (95) ester Local anesthetics, such as benzocaine and procaine; (96) musculoskeletal corticosteroid anti-inflammatory agents, such as beclomethasone, betamethasone, cortisone, dexamethasone, hydrocortisone and prednisone; (97) musculoskeletal-anti-inflammatory immunosuppressives, such as azathioprine, cyclophosphamide and methotrexate; (98) musculoskeletal nonsteroidal anti-inflammatory drugs such as diclofenac, ibuprofen, ketoprofen, ketorlac and naproxen; (99) skeletal muscle relaxants, such as diazepam; (100) reverse neuromuscular blocker skeletal muscle relaxants, such as pyridostigmine; (101) neurological agents, such as nimodipine, riluzole, tacrine and ticlopidine; (102) anticonvulsants, such as carbamazepine, gabapentin, lamotrigine, phenyloin and valproic acid; (103) barbiturate anticonvulsants, such as phenobarbital and primidone; (104) benzodiazepine anticonvulsants, such as clonazepam, diazepam and lorazepam; (105) anti-agents, such as bromocriptine, levodopa, carbidopa and pergolide; (106) anti-vertigo agents, such as meclizine; (107) opiate agonists, such as codeine, fentanyl, hydromorphone, methadone and morphine; (108) opiate antagonists, such as naloxone; (109) anti-glaucoma agents, such as timolol; (110) mitotic anti-glaucoma agents, such as pilocarpine; (111) ophthalmic aminoglycoside anti-infectives, such as gentamicin, neomycin and tobramycin; (112) ophthalmic quinolone anti-infectives, such as ciprofloxacin, norfloxacin and ofloxacin; (113) ophthalmic corticosteroid anti-agents, such as dexamethasone and prednisolone; (114) ophthalmic nonsteroidal anti-inflammatory drugs such as diclofenac; (115) antipsychotics, such as clozapine, haloperidol and risperidone; (116) benzodiazepine anxiolytics, sedatives and hypnotics, such as clonazepam, diazepam, lorazepam, oxazepam and prazepam; (117) psychostimulants, such as methylphenidate and pemoline; (118) codeine and derivatives thereof; (119) bronchodilators; (120) adrenergic agonist bronchodilators, such as albuterol; (121) respiratory corticosteroid anti-inflammatory agents, such as dexamethasone; (122) antidotes, such as flumazenil and naloxone; (123) heavy metal agents, such as penicillamine; (124) deterrent substance abuse agents, such as disulfiram, naltrexone and nicotine; (125) withdrawal substance abuse agents, such as bromocriptine; (126) minerals, such as iron, calcium and magnesium; (127) vitamin B compounds, such as cyanocobalamin (vitamin B12) and niacin (vitamin B3); (128) vitamin C compounds, such as ascorbic acid; and (129) vitamin D compounds, such as calcitriol.

Further, recombinant or cell-derived proteins may be used, such as: recombinant β-glucan; bovine immunoglobulin concentrate; bovine superoxide dismutase; recombinant hirudin (r-Hir), HIV-1 immunogen; recombinant human growth hormone, recombinant EPO (r-EPO); gene-activated EPO (GA-EPO); collagen; recombinant human hemoglobin (r-Hb); recombinant human mecasermin (r-IGF-1); recombinant interferon β-1a; lenograstim (G-CSF); olanzapine; recombinant thyroid stimulating hormone (r-TSH); topotecan; the RGD polypeptide; and any recombinantly produced polypeptide or polynucleotide.

Still further, the following listing of peptides, proteins, and other large molecules may also be used, such as interleukins 1 through 18, including mutants and analogues; interferons, LHRH and analogues, gonadotropin releasing hormone, transforming growth factor (TGF); fibroblast growth factor (FGF); tumor necrosis factor; nerve growth factor (NGF); growth hormone releasing factor (GHRF), epidermal growth factor (EGF), connective tissue activated osteogenic factors, fibroblast growth factor homologous factor (FGFHF); hepatocyte growth factor (HGF); insulin growth factor (IGF); invasion inhibiting factor-2 (IIF-2); bone morphogenetic proteins 1-7 (BMP 1-7); somatostatin; thymosin; superoxide dismutase (SOD); and complement factors, and biologically active analogs, fragments, and derivatives of such factors.

Members of the transforming growth factor (TGF) super-gene family, which are multifunctional regulatory proteins, may be incorporated in or on a polymer or multiple layer polymer of the present invention. Members of the TGF super-gene family include the β transforming growth factors (for example, TGF-β1, TGF-β2 and TGF-β3); bone morphogenetic proteins (for example, BMP-1, BMP-2, BMP-3, BMP-4, BMP-5, BMP-6, BMP-7, BMP-8 and BMP-9); heparin-binding growth factors (for example, fibroblast growth factor (FGF), epidermal growth factor (EGF), platelet-derived growth factor (PDGF) and insulin-like growth factor (IGF)), Inhibin A, Inhibin B, growth differentiating factors (for example, GDF-1); and activins (for example, Activin A, Activin B or Activin AB). Growth factors can be isolated from native or natural sources, such as from mammalian cells, or can be prepared synthetically, such as by recombinant DNA techniques or by various chemical processes. In addition, analogs, fragments or derivatives of these factors can be used, provided that they exhibit at least some of the biological activity of the native molecule. For example, analogs can be prepared by expression of genes altered by site-specific mutagenesis or other genetic engineering techniques as known in the art.

Various forms of the biologically active agents may be used. These include, without limitation, such forms as uncharged molecules, molecular complexes, salts, ethers, esters, amides, and the like, which are biologically activated when implanted, injected or otherwise placed into a subject.

In certain embodiments, a polymer of interest can be formed into desired structures, such as films, scaffolds or other three-dimensional structures of interest. In such circumstances, other materials may be incorporated into subject compositions, in addition to one or more biologically active agents. For example, plasticizers and stabilizing agents known in the art may be incorporated in compositions of the present invention. In certain embodiments, additives such as plasticizers and stabilizing agents are selected for their biocompatibility.

A composition of this invention may further contain one or more adjuvant substances, such as fillers, thickening agents or the like. In other embodiments, materials that serve as adjuvants may be associated with the composition. Such additional materials may affect the characteristics of the composition that results. For example, fillers, such as bovine serum albumin (BSA) or mouse serum albumin (MSA), may be associated with the polymer composition. In certain embodiments, the amount of filler may range from about 0.1 to about 50% or more by weight of the composition, or about percent. Incorporation of such fillers may affect the sustained release rate of any encapsulated substance. Other fillers known to those of skill in the art, such as carbohydrates, sugars, starches, saccharides, celluloses and polysaccharides, including and sucrose, may be used in certain embodiments in the present invention.

A composition of interest can be used as a tissue sealant. Thus, a composition of interest can be configured to react with tissue surfaces. For example, chondroitin sulfate derivatized with methacrylate groups and with aldehyde groups provides a biologically compatible polymer that can react with amine groups on the tissue surfaces and with methacrylate groups on biopolymer molecules. The composition of interest can be, for example, applied to a first tissue surface to form a coated surface and then the coated surface is brought into contact with a second tissue surface to enable sealing of the first and second tissue surfaces. Uses include sealing skin following a mastectomy or other surgical procedure or any other wound closure.

Also, a composition of interest can be combined with a biologically compatible polyamine prior to exposing to a tissue surface. Suitable polyamines include an animated polyethylene glycol (PEG), spermine, poly-1-lysine, spermidine and so on.

In certain embodiments, a polymer of interest can be formed into desired structures, such as films, foams, scaffolds or other three-dimensional structures of interest. In such circumstances, other materials may be incorporated into subject compositions, in addition to one or more biologically active agents. For example, plasticizers and stabilizing agents known in the art may be incorporated in compositions of the present invention. Thus, a biologically compatible polymer of interest may be applied to a biological surface as a solid structure and enabled to react with the biological surface. The bridging molecule then can be brought into proximity with the affixed biologically compatible polymer to react therewith. In other embodiments, the biologically compatible polymer is used without the bridging molecule. Thus, the biologically compatible polymer is used as an adhesive. The polymer can be applied in liquid form to the biological surface of interest. Alternatively, the polymer can be combined with an inert structure, which can provide support or serve as a carrier for the polymer, such as a backing for an adhesive bandage, or with a structure or device having a desired function.

A composition of this invention may further contain one or more adjuvant substances, such as fillers, thickening agents or the like. In other embodiments, materials that serve as adjuvants may be associated with the composition. Such additional materials may affect the characteristics of the composition that results. For example, fillers, such as bovine serum albumin (BSA) or mouse serum albumin (MSA), may be associated with the polymer composition. In certain embodiments, the amount of filler may range from about 0.1 to about 50% or more by weight of the composition, or about percent. Incorporation of such fillers may affect the sustained release rate of any encapsulated substance. Other fillers known to those of skill in the art, such as carbohydrates, sugars, starches, saccharides, celluloses and polysaccharides, including and sucrose, may be used in certain embodiments in the present invention.

Buffers, acids and bases may be incorporated in the compositions to adjust for pH. Agents to increase the diffusion distance of agents released from the composition may also be included.

The charge, lipophilicity or hydrophilicity of any subject composition may be modified by employing an additive. For example, surfactants may be used to enhance miscibility of poorly miscible liquids. Examples of suitable surfactants include dextran, polysorbates and sodium lauryl sulfate. In general, surfactants are used in low concentrations, generally less than about 5%.

Biologically active agents may be incorporated into the polymer by admixture. Alternatively, the agents may be incorporated into a multi-layer polymer or attached to a polymer of interest by binding these agents to the functional groups on the polymers. Such compositions may include linkages that can be easily biodegraded, for example as a result of enzymatic degradation, resulting in the release of the active agent into the target tissue, where it will exert its desired therapeutic effect.

A simple method for incorporating biologically active agents containing nucleophilic groups into the polymer involves mixing the active agent with a polyelectrophilic component prior to addition of the polynucleophilic component. By varying the relative molar amounts of the different components of the reactive composition, it is possible to alter the net charge of the resulting polymer composition, for example, to prepare a composition for the delivery of a charged compound, such as a protein or ionizable drug. As such, the delivery of charged proteins or drugs, which would normally diffuse rapidly out of a neutral carrier, can be controlled.

For example, if a molar excess of a component that is polynucleophilic is used, the resulting composition may have a net positive charge and can be used to ionically bind and deliver negatively charged compounds. Examples of negatively charged compounds that can be delivered from these matrices include various drugs, cells, proteins and polysaccharides.

If a molar excess of a component that is polyelectrophilic is used, the resulting composition has a net negative charge and can be used to ionically bind and deliver positively charged compounds. Examples of positively charged compounds that can be delivered from these matrices include various drugs, cells, proteins, and polysaccharides.

A polymer of the present invention can also be used to deliver various types of living cells or genes to a desired site of administration. The term "genes" as used herein is intended to encompass genetic material from natural sources, synthetic nucleic acids, DNA, antisense DNA, RNA, siRNA, RNAI and so on.

For example, mesenchymal stem cells can be delivered using the polymers of interest. Mesenchymal stem cells may not differentiated and therefore may differentiate to form various types of new cells due to the presence of an active agent or the effects (chemical, physical etc.) of the local tissue environment. Examples of mesenchymal stem cells include osteoblasts, chondrocytes and fibroblasts. For example, osteoblasts can be delivered to the site of a bone defect to produce new bone; chondrocytes can be delivered to the site of a cartilage defect to produce new cartilage; fibroblasts can be delivered to produce collagen wherever new connective tissue is needed; neurectodermal cells can be delivered to form new nerve tissue; epithelial cells can be delivered to form new epithelial tissues, such as liver, pancreas etc.

The cells or genes may be either allogeneic or xenogeneic in origin. For example, the compositions can be used to deliver cells or genes other species that have been genetically modified. In some embodiments, the compositions of the invention may not easily be degraded in vivo, cells and genes entrapped within the polymer compositions will be isolated from the patient cells and, as such, should not provoke an immune response when returned to the patient.

To entrap the cells or genes within a polymer, the cells or genes may, for example be pre-mixed with a composition comprising functionalized polymer, and optionally, a further biocompatible polymer. That may occur through a particular reaction or may occur during the making of a multiple layer polymer. Alternatively, the cells may be contained within a target entity attached to a polymer of interest.

The reactive components of the polymer, such as monomers or oligomers, can be infused or instilled at a desired site. The present invention may be prepared to include an appropriate vehicle for this injection, implantation, infusion or direction. Once at the site, the functionalized biologically compatible polymer comprising at least two functional groups can be polymerized as taught herein or as known in the art. The polymer then will react with the surface of interest, such as a tissue. Thus, the polymer is "biologically anchored" to the host tissue. An entity reactive with the other reactive moiety now exposed on the host biological surface, such as a chemically compatible hydrogel, then can be added to react with a polymer of interest, the result being the hydrogel now is biologically anchored to the host biological surface.

The polymer, alternatively, may be formed as a solid object implantable in the anatomic area, or as a film or mesh that may be used to cover a segment of the area. Known inert ingredients can be mixed with a polymer of interest to make a suitable form, such as film, scaffold, gel and so on, as taught herein. A variety of techniques for implanting solid objects in relevant anatomic areas will be likewise familiar to practitioners of ordinary skill in the art. In one embodiment, a biologically compatible polymer is configured into a film. The bridging molecule of interest also is configured into a film. The two films then are applied as needed to the biological surfaces as needed. In another embodiment, the two such films are combined into a single multilayer film. In another embodiment, a third layer comprising a biologically compatible polymer is included in the multilayer film, for example, attached to the film comprising the bridging molecule. The layers containing the biologically compatible polymer and the bridging molecule may be separated by a third intervening film layer, which may be an inert material which serves a separating function, a support function or both. The multilayer film may be attached to an inert support, which may be removed when the multilayer film is used leaving the multilayer film alone at the biological surface. The adhesive activities of the biologically compatible polymer and bridging molecule are activated on hydration of the films, for example, by body and tissue fluids. A variety of techniques for implanting solid objects in relevant anatomic areas will be likewise familiar to practitioners of ordinary skill in the art.

In some embodiments, compositions disclosed herein may be positioned in a surgically created defect that is to be reconstructed, and is to be left in this position after the reconstruction has been carried out. The present invention may be suitable for use with local tissue reconstructions, pedicle flap reconstructions or free flap reconstructions.

In some embodiments, the invention is directed to kits. In certain embodiments, this invention contemplates a kit including subject compositions and instructions for use. For example, the kit may comprise a double functionalized biologically compatible polymer and a biocompatible entity, such as a prosthesis or hydrogel reactive therewith. The kit may contain a hydrogel with a monomer that contains a functional group reactive with a functional group of the biologically compatible polymer. The kit may contain suitable instructions.

To prolong shelf life and to comply with regulatory guidelines for use with animals and humans, the reagents and components for practicing the invention, and for inclusion in a kit, can be sterilized. Chemical reagents can be exposed to forms of sterilization suitable to the reagent as known in the art. Thus, some chemical reagents can be heat sterilized, for example, using steam, or pasteurized. Other reagents can be sterilized by passage through filtration media that can remove pathogens, such as a membrane filter of appropriate pore size. Alternatively, cold sterilization techniques can be practiced to avoid using heat. Suitable cold sterilization techniques include use of ethylene oxide, irradiation, using gamma rays, xrays, electron beams, plasma or microwaves, ozone and the like. Some of the cold sterilization techniques may be performed below ambient temperature including below 0 degrees C. The sterilization can be performed at ambient, lower or higher pressures. Also, ambient or inert atmosphere can be used. Additionally, excipients, such as sugars, organic acids, such as ascorbate or citric acid, and other stabilizers can be added to the reagents prior to sterilization.

The functionalized polymer of interest contains at least two functional groups. The functional groups generally are represented equally along the length of the polymer. The at least two different functional groups found on a polymer enable a directional application of the polymer of interest. Thus, the functionalized polymer of interest is reacted first with one site on a first target entity via one of said reactive moieties and then is reacted with a site on a second target entity via a second of said reactive moieties. For example, a functionalized polymer of interest is applied to a first tissue and allowed to react therewith, and then the polymer now attached to the first tissue is exposed to a second tissue and allowed to react therewith, thereby joining the first and the second tissues.

Alternatively, the functionalized polymer of interest can be exposed to a first and a second tissue and allowed to react therewith simultaneously. The at least two functional groups are configured to react with one or the other tissue.

In another embodiment, one of the functional groups is reactive not with a tissue but with another substance for use in a body, such as a prosthesis, a hydrogel, a scaffold, a matrix and so on. Thus, the functionalized polymer of interest can be used to secure that substance to a tissue or to a particular site in a body.

The bridging molecule generally is a polymer that contains plural reactive sites, wherein said reactive sites are those which react with sites found on a biologically compatible polymer of interest. The bridging molecule is biocompatible. The bridging molecule, as with the biologically compatible polymer, can be biodegradable. The bridging molecule can be configured into a multiple layered structure, wherein the internal layers can be the same or different so long as the superficial, external layers present with exposed reactive sites for reacting with sites on the tissue-adhered polymer.

In the case where the polymer attached to a tissue contains reactive aldehyde groups, a suitable bridging molecule is one that contains, for example, plural amino groups. An example of such a molecule is poly-lysine or copolymer of vinyl alcohol and vinyl amine. Other suitable molecules that include amine groups include glucosamine, poly(glucosamine), chitosan and the like. Other suitable molecules are synthetic biocompatible polymers containing multiple amine groups. For example, polyols can be reacted with carbonyl diimidazol activated diamines to aminate via the hydroxyl groups on the polymers, such as polyvinyl alcohol (PVA), polyethylene glycol (PEG) and the like. Other molecules can be aminated using known techniques. Thus, hydroxy methylacrylate (HEMA) can be reacted to contain an amine group.

Contemplated equivalents of the polymers, polymeric matrices, subunits and other compositions described herein include such materials which otherwise correspond thereto, and which have the same general properties thereof wherein one or more simple variations of substituents are made which do not adversely affect the efficacy of such molecule or composition to achieve its intended purpose. In general, the compounds of the present invention may be prepared by the methods illustrated in the general reaction schemes as, for example, described above, or by modifications thereof, using readily available starting materials, reagents and conventional synthesis procedures. In these reactions, it is also possible to make use of variants which are in themselves known, but are not mentioned here.

The invention now will be exemplified in the following non-limiting examples.

After approval by the Institutional Review Board of the Johns Hopkins University, donor corneoscleral rims (n=8) not suitable for transplantation were obtained from the Central Florida Lions Eye and Tissue Bank. Corneas were preserved under standard eye bank conditions in Optisol-GS medium (Bausch & Lomb Surgical, Inc, San Dimas, Calif.) at 4° C. The procedure was performed no longer than 10 days after death.

A manual microkeratome (LSK One; Moria USA, Doylestown, Pa.) was used to perform a hinged-flap keratectomy just past the central opening of the chamber, in a way that a large hinge is obtained. This opening is similar to an artificial non-dilated pupil, which could be the reference point in a clinical setting. A 300 µm head thickness was used in all corneas. An artificial anterior chamber (ALTK System; Moria USA) was used to support the corneoscleral rims, as known in the art. The gearless tracks on the base plate of the artificial anterior chamber were designed to fit into the microkeratome head, so that its pass across the cornea maintains the same plane and direction. All discs with posterior stroma, Descemet's membrane and endothelial cell layer were obtained using a 6.25 mm freehand trephine.

Infusion of isotonic sodium chloride was released before the corneoscleral rims were placed on the base of the anterior chamber to clear the residual air from both the infusion line and underneath the cornea. The solution bottle was raised 1.5 m above the level of the chamber to obtain adequate intrachamber pressures (60-70 mm Hg) for the microkeratome pass. Corneas were centered according to circular guides in the base of the chamber. Mechanical epithelial scraping was performed with a 2.5 mm straight, rounded tip crescent knife (Beaver, Beckton Dickinson Surgical Systems, Franklin Lakes, N.J.) to avoid surface irregularities due to loose epithelium, which may introduce errors in pachymetric and videokeratographic measurements.

The artificial anterior chamber was set to achieve a maximal flap diameter in all cases. The maneuver was intended to leave as much area in the stromal bed as possible for performing the trephination and suturing of the flap. The surgeries were all performed by the same surgeon to avoid variability related to different surgeons, using a surgical microscope (Ophthamic 900S; Moeller-Wedel, Hamburg, Germany).

Several drops of 0.5% proparacaine hydrochloride were applied to the corneal surface prior to the microkeratome pass to resemble clinical conditions. A partial flap-keratectomy was performed by passing the microkeratome head with its oscillating blade at a relatively constant speed across the plate stopping just past the central opening of the chamber. This approach differs from previously published techniques, in an attempt to obtain a wide flap hinge with a relatively less likelihood of flap slippage, so that more stability to the corneal flap is added and the corneal opening is reduced. The remaining stroma underneath the flap hinge was severed using a 2 mm wide Culler iris spatula (Sparta Surgical Corporation, Concord, Calif.), as to leave adequate space to perform a central trephination. Intrachamber pressure was returned to 18 to 20 mmHg by lowering the height of the isotonic sodium chloride solution bottle to 25 cm above the cornea level, and the trephine was centered according to the keratectomy and "pupillary" edge provided artificially by the central opening of the chamber. A hand trephine of 6.25 mm in diameter was used to perform a circular cut of the stromal bed. The trephine blade was carefully rotated until perforation, and the remaining circular cut completed with corneal scissors. Donor buttons were placed in the recipient beds, left unsutured, and the flap repositioned.

The experiment consisted of two groups of four corneas each. In one group (Group 1), the flap was secured with five interrupted sutures (10-0 Nylon, Sharpoint Surgical Specialties Corporation, Reading, Pa.). The suturing technique was the same in all corneas to ensure consistency.

In the second group (Group 2), the flap was secured using a tissue adhesive based on chondroitin sulfate.

The two components do not require any light or laser activation to achieve polymerization. CS-aldehyde and the bridging reagent (amine provider) PVA-A react with an amine-aldehyde interaction via a Schiff base mechanism, effective in high protein content tissues such as the cornea.

The synthesis of the effective gluing reagent of the adhesive, CS-aldehyde, is based on oxidization of adjacent hydroxyls on the CS backbone into aldehyde functional groups by periodate salt. Six hundred milligrams of chondroitin sulfate (CS; 0.8-1.2 mmol of adjacent diol, 70% CS-A; Sigma-Aldrich, St. Louis, Mo.) and 616 mg of sodium periodate (~2.88 mmol $NaIO_4$; Sigma-Aldrich) were dissolved together in 10 mL of deionized water and were protected from light. The reaction was allowed to continue for ~16 hours in the dark, with vigorous stirring. The insoluble byproducts were removed with a 0.22-μm filter, and the product was loaded into a Sephadex G-25 (Sigma-Aldrich) size-exclusion chromatography (SEC) column, by which the product was purified of water-soluble byproducts and unreacted small molecules. The product, CS-aldehyde, was obtained by lyophilization with a yielding rate of ~90%. The determination of the degree of aldehyde substitution was performed by hydroxylamine hydrochloride titration. The gluing component of the adhesive was a 40% water solution of CS-aldehyde, which is transparent to light and slightly yellow.

The bridging component, 10% PVA-A, was used to overlay the CS-aldehyde once it was applied and the component was intentionally stained blue with an albumin-specific and biocompatible dye (Cibacron Blue; Sigma-Aldrich). Staining the bridging component permitted direct observation of the polymerized glue relative to the incision and ensured that the glue did not gain entry into the anterior chamber.

A 2.5-mm, straight, rounded-tip, crescent knife (Beaver; BD Surgical Systems) was used to apply the bridging component of the adhesive (PVA-A) to the wound margins. A thin layer was used to coat the surface of the incision and the internal would lip, approximately 0.5 mm in from the outer wound edge. With a second crescent knife, a thin layer of CS-aldehyde was then applied over the first layer. The two components were allowed to polymerize for 30 seconds. Once the glue solidified, saline was infused.

In both groups, the transplanted disc was left without sutures or glue, as it tends to keep in place by surface tension after the intrachamber pressure reaches 15-18 mmHg.

After epithelium removal, the isotonic sodium chloride infusion was closed, and corneal thickness was measured using an ultrasound pachymeter (Pach IV, Accutome Inc, Malvern, Pa.) in the center of the cornea. A second measurement was made after the hinged flap was created and reflected from the stromal bed. Central flap thickness was then calculated.

For surface curvature analysis, a commercial videokeratoscope (EyeSys Laboratories, Inc, Houston, Tex.) was used. The Placido disc was placed in a vertical position and the chamber centered according to the monitor control. Care was taken to preserve the orientation in preoperative and postoperative recordings. Three measurements were performed preoperatively and postoperatively for each cornea.

To assess graft stability, intrachamber pressure was raised progressively by changing stepwise the height of the bottle. Under visual control with the surgical microscope at ×12 magnification, presence of leakage was monitored and pressure recorded by a digital manometer (Digimano 1000, Netech Corp., Hicksville, N.Y.).

Calculations were made using StatsDirect, version 1.9.0, for Windows (CamCode, Ashwell, England). Mean, SD, minimum and maximum values were described. Comparisons between groups were performed using the nonparametric Mann-Whitney U test for unpaired samples and the Wilcoxon signed rank test for paired samples. A Spearman rank correlation test was performed to assess the dependence of resisted pressure on donor size. $P \leq 0.05$ was considered statistically significant.

The mean (SD) flap thickness was 317.25 μm (51.65) in group 1, and 263.25 μm (67.73) in group 2 (p=0.25).

There was a significant difference regarding the preoperative and postoperative change in average keratometry values between both groups. The mean (SD) change in average keratometry value for group 1 was 3.08 D (0.84); whereas for group 2, that change was 1.13 D (0.55) (p=0.008).

In terms of stability of the graft, great variability was observed in both groups. A higher resistance was observed in group 1. The mean calculated resisted pressure was 95.67 mm Hg (27.37) (range, 56.2-119.5 mm Hg). Group 2 had a lower leaking pressure of 82.45 (18.40) mm Hg (range, 57.9-102.1 mm Hg).

The tissue adhesive produced less astigmatism than other reports of microkeratome-assisted posterior lamellar keratoplasty. Furthermore, the absence of sutures made the technique more simple and considerably less time consuming.

The composition of the instant invention can be used to adhere two separated surfaces, at least one of which is a biological surface. Thus, the instant composition can be used to seal a wound or an opening by bringing the open edges together in juxtaposition. The sealing can be long term or can be short term based on the level of biodegradability of the components of the instant adhesive. A short term seal can provide a suitable time for a healing or a natural sealing of the opening to occur. Alternatively, the medical adhesive of interest can be used to adhere a non-biological but biocompatible surface to a biological surface. Such a non-biological surface can be found, for example, on a prosthesis, a medical device and so on.

All publications and patents mentioned herein are hereby incorporated by reference in their entirety as if each individual publication or patent was specifically and individually indicated to be incorporated by reference.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A composition comprising a biologically compatible polymer functionalized with at least two species of reactive moiety, wherein one reactive moiety binds to a biological surface, and one of said reactive moieties is methacrylate or aldehyde.

2. The composition according to claim 1, wherein said polymer comprises at least ten monomeric units.

3. A composition comprising a biologically compatible polymer functionalized with at least two species of reactive moiety, wherein said polymer is functionalized through one or more thio, carboxylic acid or alcohol moieties.

4. A composition comprising the composition of claim 1 and a biological surface.

5. The composition of claim 4, wherein said biological surface is on a cell, tissue or organ.

6. The composition of claim 5, wherein said tissue is ocular tissue.

7. The composition of claim 5, wherein said tissue comprises an intervertebral disc.

8. A composition comprising the composition of claim 1 and a hydrogel functionalized with a reactive moiety.

9. The composition of claim 8, wherein said hydrogel comprises poly(ethylene oxide) diacrylate.

10. The composition of claim 8, wherein said hydrogel further comprises a biocompatible polymer.

11. The composition of claim 10, wherein said biocompatible polymer is hyaluronic acid.

12. The composition of claim 8, wherein said hydrogel comprises a biologically active agent.

13. A composition comprising the composition of claim 1 and a polyfunctional bridging molecule reactive therewith.

14. The composition of claim 13, wherein said bridging molecule reacts with said reactive moiety which reacts with a biological surface.

15. The composition of claim 13, wherein said biologically compatible polymer comprises a second reactive moiety, wherein said bridging molecule reacts with said second reactive moiety.

16. The composition of claim 13, wherein said polyfunctional bridging molecule comprises multiple amine groups.

17. A composition comprising the composition of claim 13 and a biological surface.

18. The composition of claim 17, wherein said biological surface is on a cell, tissue or organ.

19. The composition of claim 18, wherein said tissue is ocular tissue.

20. A composition comprising the composition of claim 1 and a support.

21. The composition of claim 20, wherein said support is an inert carrier.

22. The composition of claim 13, wherein said polymer comprises a film and said bridging molecule comprises a film, wherein said films are stacked on each other.

23. The composition of claim 22, comprising a third film comprising a biologically compatible polymer, stacked onto said film comprising said bridging molecule.

24. The composition of 23, further comprising a support.

25. The composition of claim 24, wherein said support is an inert carrier.

26. A composition comprising the composition of claim 20 and a biological surface.

27. The composition of claim 26, wherein said biological surface is on a cell, tissue or organ.

28. The composition of claim 27, wherein said tissue is ocular tissue.

29. A composition comprising the composition of claim 13 and a support.

30. The composition of claim 29, wherein said support is an inert carrier.

* * * * *